United States Patent
Andresen et al.

(10) Patent No.: US 9,570,913 B2
(45) Date of Patent: Feb. 14, 2017

(54) GENERATOR FOR PRODUCING ELECTRIC POWER

(71) Applicant: SIEMENS AKTIENGESELLSCHAFT, München (DE)

(72) Inventors: Björn Andresen, Ostbirk (DK); Jesper Elliot Petersen, Olgod (DK); Arwyn Thomas, Cheshire (GB); Zhan-Yuan Wu, Sheffield (GB); Zhen Ping Xia, Sheffield (GB)

(73) Assignee: Siemens Aktiengesellschaft (DE)

( * ) Notice: Subject to any disclaimer, the term of this patent is extended or adjusted under 35 U.S.C. 154(b) by 142 days.

(21) Appl. No.: 14/661,798

(22) Filed: Mar. 18, 2015

(65) Prior Publication Data

US 2015/0311719 A1    Oct. 29, 2015

(30) Foreign Application Priority Data

Apr. 29, 2014    (EP) .................................... 14166394

(51) Int. Cl.
*H02J 3/00*    (2006.01)
*H02J 3/36*    (2006.01)
(Continued)

(52) U.S. Cl.
CPC ............... *H02J 3/36* (2013.01); *F03D 9/005* (2013.01); *H02P 9/02* (2013.01); *H02P 9/14* (2013.01);
(Continued)

(58) Field of Classification Search
CPC ...................................................... H02J 3/36
See application file for complete search history.

(56) References Cited

U.S. PATENT DOCUMENTS

2002/0171246 A1    11/2002    Gao
2011/0074326 A1    3/2011    Su
(Continued)

FOREIGN PATENT DOCUMENTS

GB         2350946 A       12/2000
SE    WO 2004030199 A2 *   4/2004    ............. H02P 9/102

OTHER PUBLICATIONS

Zhiqiao Wu et al.: "Control of a Dual Stator Winding Induction Machine as a Source of DC Power"; Conference Record of the 2005 IEEE Industry Apllications Conference Fortieth IAS Annual Meeting Oct. 2-6, 2005 Kowllon, Hong Kong, IEEE; vol. 2; pp. 1089-1096; ISBN: 978-0-7803-9208-3; DOI: 10.1109/IAS.2005.1518492; XP010842516; Oct. 2, 2005.
(Continued)

*Primary Examiner* — Daniel Cavallari
(74) *Attorney, Agent, or Firm* — Schmeiser Olsen & Watts LLP

(57) ABSTRACT

A generator for producing electric power, the generator including a generator unit including a stator) and a rotatably supported rotor, wherein the stator includes a first set of windings and a second set of windings, and the rotor is adapted to induce electrical voltage in the first set of windings and in the second set of windings when the rotor is rotated relative to the stator, the generator further includes a first converter coupled to the first set of windings, the first converter being adapted to convert alternating voltage in the first set of windings into an output DC voltage, a DC output coupled to the first converter to receive the output DC voltage, and a second converter coupled to the second set of windings and to the DC output, the second converter being adapted to generate control voltages and/or control currents in the second set of windings, is provided.

14 Claims, 7 Drawing Sheets

(51) Int. Cl.
    *H02P 9/02*           (2006.01)
    *F03D 9/00*           (2016.01)
    *H02P 25/22*         (2006.01)
    *H02P 9/14*           (2006.01)
    *H02J 3/38*           (2006.01)

(52) U.S. Cl.
    CPC ............... *H02P 21/24* (2016.02); *H02P 25/22* (2013.01); *H02J 3/386* (2013.01); *Y02E 10/725* (2013.01); *Y02E 10/76* (2013.01)

(56) References Cited

U.S. PATENT DOCUMENTS

2012/0126758 A1*   5/2012   Fang ........................ H02P 9/48
                                                                     322/29
2012/0217746 A1*   8/2012   Groendahl ............. F03D 9/002
                                                                       290/44
2013/0234678 A1     9/2013   Pourkermani

OTHER PUBLICATIONS

Extended European Search Report for European Application No. 14166394.8, mailed on Nov. 18, 2014.

\* cited by examiner

GENERATOR FOR PRODUCING ELECTRIC POWER

CROSS-REFERENCE TO RELATED APPLICATIONS

This application claims priority to European Application No. 14166394.8, having a filing date of Apr. 29, 2014, the entire contents of which are hereby incorporated by reference.

FIELD OF TECHNOLOGY

The following relates to the field of generators for producing electric power, in particular, to generators for producing an output DC voltage based on alternating currents induced by rotation, e.g. of a wind turbine. The following further relates to a system for generating electric power and to a method of producing electric power.

BACKGROUND

In electric power generation, such as wind power generation, one of the established configurations is to use a full power back-to-back converter system. In such systems, the generator, e.g. wind turbine, is controlled by a voltage source converter to deliver power to a DC link, and another voltage source converter connected to this DC link is controlled to feed the power to the grid.

In conventional full power back-to-back voltage source converter power generation systems, the generator converter is rated to have the same levels of voltage and current as the generator. Further, the converter is operated in pulse width modulation (PWM) mode in order to provide the required voltages and currents to the generator. With concern to the current harmonics and torque ripples in the generator and generator control dynamics, the PWM switching must occur at a relatively high rate, such as 2.5 kHz. As each switching causes additional power losses in the power components (and thus heat), a higher switching frequency will not only cause reduced efficiency and increased requirements for converter cooling, but also more importantly result in a shorter lifetime for the converter. The latter is particularly undesirable for offshore wind power applications.

Given the existing power component techniques, it is difficult to handle the required power level for wind power generation with a single power unit. Instead, modular converters are often used, where several power units are arranged in parallel for providing the required power/current level. In order to improve the current sharing between paralleled modules, especially during switching transients, special techniques have been applied, such as pulse insertion or dropping. Nevertheless, some compromises are still placed to allow less ideal switching, and more modules have to be used to create the needed current/power margins. However, an increased number of components means higher cost and less reliability on the system level.

The technical challenges to the conventional converter system are becoming severer as wind power generation is heading towards even higher voltages and larger power levels.

Several alternative lower cost converter topologies utilizing diode rectifiers and boost converters in the DC link have been discussed in the literature. However, the generator stator currents cannot be controlled directly and independently using a diode rectifier. Furthermore, known torque ripple methods using a boost converter in the DC link suffer from limited controllability and increased latency due to the diode rectifier.

Accordingly, there may be a need for an electric power generator without the above drawbacks, in particular an electric power generator that is capable of reliably meeting the demands regarding high voltage and power levels and which at the same time is relatively cheap and easy to manufacture and implement.

SUMMARY

An aspect relates to a generator for producing electric power, the generator comprising (a) a generator unit comprising a stator and a rotatably supported rotor, wherein the stator comprises a first set of windings and a second set of windings, and wherein the rotor is adapted to induce electrical voltage in the first set of windings and in the second set of windings when the rotor is rotated relative to the stator, the generator further comprising (b) a first converter coupled to the first set of windings, the first converter being adapted to convert alternating voltage in the first set of windings into an output DC voltage, (c) a DC output coupled to the first converter to receive the output DC voltage, and (d) a second converter coupled to the second set of windings and to the DC output, the second converter being adapted to generate control voltages and/or control currents in the second set of windings.

Embodiments of the invention are based on the idea that the first (or main) set of windings and the first (or main) converter are mainly dedicated to power generation while the second (or auxiliary) set of windings and the second (or auxiliary) converter are mainly dedicated to generation of control voltages and/or control currents in the second set of windings in order to perform various control functions on the generator unit. Thereby, the first converter can be optimized with regard to power production, while the second converter can be optimized with regard to control functions. Since the first converter does not need to be involved in the control functions, the first converter can be designed in a simple manner with cheap components optimized for handling high power levels. On the other hand, as the performance of the control functions involves handling of significantly less power in comparison to the first converter, the second converter can be designed to perform the control functions without having to account for the above described considerations with regard to high power levels. This has the further advantage that the currents in the second set of windings will be significantly lower than the currents in the first set of windings. Thus, the wires used for the second windings may have a significantly lower current rating, i.e. no more than a third of the current rating of the wires used for the first set of windings, and may accordingly be added to the stator without incurring significant costs and without taking up a significant amount of space.

In other words, the generator according to this aspect utilizes two different converters arranged in parallel between the generator unit and the DC output: a main (first) converter for providing the actual power output, and an auxiliary (second) converter for handling control functions, such as e.g. stator flux control.

In summary, the generator is capable of reliably producing significant amounts of power while being relatively cheap and simple in construction.

The generator unit may be a permanent magnet machine, an externally excited synchronous machine, an induction machine, a switched reluctance machine, etc. In particular, the generator unit may be a permanent magnet machine for a direct drive wind turbine.

According to an embodiment of the invention, the first converter comprises a diode full-bridge rectifier, and/or the second converter comprises a PWM full-bridge converter.

In other words, the first converter may comprise a standard full-bridge diode rectifier with simple and cheap components. As the commutations occur naturally, the switching losses in the rectifier will be insignificant. Furthermore, the conduction losses will also be low due to the relatively low voltage drop in the diodes. The reduced stress means that the rectifier will be more reliable and have a long lifetime. Furthermore, due to the natural switching, several diode rectifier modules may be arranged in parallel to form the first converter. If desirable from a cost-benefit point of view, advanced diodes, such as Silicon-Carbide diodes, could be used to further improve the performance of the first converter.

Furthermore, the second converter may comprise a conventional voltage source full-bridge type converter. As its main function is not to produce power but rather to generate control voltages and/or currents in the stator system, the power rating for the second converter can be significantly lower than the full rated converter in a conventional design (see discussion in the introduction). Considering the typical current angle in a general megawatt generator design, the second converter may only be a third or even less of the full size.

Thus, a significant simplification and cost reduction is achieved in comparison to the standard full power back-to-back converter system.

According to a further embodiment of the invention, the second converter is adapted to perform at least one of the following functions: (a) a sensorless field orientated vector control, (b) Id current control for field weakening or field strengthening in the stator, (c) DC output voltage regulation (either directly or through field control), (d) active and reactive power control (either directly or through field control), (e) harmonic current control to compensate for the harmonics produced from the rectifier commutations, (f) torque ripple or vibration control by injection of harmonic currents, (g) cogging torque control, (h) generator power factor control or efficiency control by field regulation in the second system, and (i) various other control functions, such as drive-train damping control and support for grid fault conditions.

The above-mentioned control functions are similar to those performed by the conventional full rated back-to-back system and will not be discussed further here. In comparison to the conventional back-to-back system, the second converter is dedicated to these functions and can accordingly have a significant lower power rating (see also above).

According to a further embodiment of the invention, the generator further comprises a control unit for controlling operation of the second converter.

The control unit is preferably adapted to communicate with appropriately arranged sensors for obtaining the relevant measurement data. In fact, the control unit is capable of controlling the second converter in a similar manner as the conventional back-to-back converter is controlled, without however having to handle the actual power production.

According to a further embodiment of the invention, the control unit is adapted to control the second converter based on measurement data that is representative of the currents in the first set of windings, the currents in the second set of windings, the voltage at the DC output, and the current at the DC output.

Sensor systems for obtaining and communicating the above-mentioned measurement data are known in the art and will not necessitate any significant design measures to implement in connection with the second converter of embodiments of the present invention.

According to a further embodiment of the invention, the stator comprises a plurality of stator slots for holding the first set of windings and the second set of windings, wherein each stator slot holds at least one winding of the first set of windings and at least one winding of the second set of windings.

In general, the design of the stator corresponds to a conventional stator with one set of windings (typically three windings in a 3-phase generator) arranged in stator slots. For example, in case of an outer rotor design, the first set of windings may be arranged in the deeper region of the stator slots, i.e. farthest away from the rotor, with the second set of windings on top, i.e. closest to the rotor. It goes without saying that the windings need to be appropriately insulated from each other.

As the first set of windings does not need to carry the full currents as in the full-rated back-to-back converter, the current rating for the first set of windings can be less than in the conventional system. However, the number of turns needs to be adapted such that the generated EMF matches the required DC voltage at the output.

Similarly, the auxiliary windings need mainly to carry the required currents for performing the control functions. Thus, the second set of windings need only comply with this current rating, which is no more than a third of the current rating in the main windings. The number of turns in the second set of windings may be somewhat less than in the first set of windings, such that the rectified voltage from the auxiliary windings will be lower than that of the first set of windings. A further consideration may be that the number of turns shall be sufficiently high to allow the second set of windings to create the required flux regulation and/or to produce the required active/reactive power when necessary.

Generally, the design of the generator unit may be slightly adapted in comparison to the conventional design, such that the open circuit flux is slightly less saturated, and such that when operating at the rated conditions there will be little need for field weakening, or when operating at low generator speeds, a little room will be left for field strengthening.

According to a further embodiment of the invention, the number of windings in the first set of windings is equal to or larger than the number of windings in the second set of windings.

In one example according to this embodiment, both the first set of windings and the second set of windings have three windings. This is a standard 3-phase implementation.

In a further example according to this embodiment, the first set of windings has six windings and the second set of windings has three windings. In this case, the first converter is designed to handle six phases. For example, the first converter may be constructed as a six-legged diode-based rectifier. Thereby, current ripples caused by diode rectifier operation can be significantly reduced in comparison to a corresponding 3-legged diode-based rectifier and therefore, the size of the second converter can be further reduced.

According to a further embodiment of the invention, the output DC voltage of the first converter is equal to an output DC voltage of the second converter, and the first converter and the second converter are coupled in parallel to the DC output.

In other words, the first and second converters have identical output voltage ratings and are arranged in parallel between the generator unit and the DC output.

According to a further embodiment of the invention, the output DC voltage of the first converter is larger than an output DC voltage of the second converter, wherein the first converter is coupled to the DC output via at least two capacitors connected in series, and wherein the second converter is coupled to the DC output via one of the at least two capacitors.

This embodiment is particularly advantageous in case the first converter is a diode-based rectifier and the second converter is a full-bridge active converter operating in PWM-mode. In this case, cheaper standard components can be used in the second converter and at the same time higher controllable currents can be achieved in the second set of windings, which improves the controllability of the generator unit (higher flux). At the same time, the voltage level on the first converter (diode rectifier) can be kept relatively high in order to reduce the current rating and the electrical losses.

More specifically, the first converter may be a 3.3 kV diode-based rectifier while the second converter may be a relatively cheap active converter with standard rating as low as 480 V or 690 V.

According to a second aspect of the invention, there is provided a system for generating electric power, the system comprising a plurality of generators according to any of the preceding claims.

This aspect of the invention is based on the idea that a plurality of the advantageous generators according to the first aspect are arranged to operate in concert. Thereby, a power production system is provided that is capable of producing significant amounts of power while still being relatively cheap to manufacture and maintain.

According to an embodiment of the invention, at least one generator of the plurality of generators comprises a wind turbine.

In particular, the system may be a wind park, such as an offshore wind park. Alternatively, the system may also contain other types of generators (in addition to the at least one wind turbine), such as tidal turbines or steam driven turbines.

According to a further embodiment of the invention, the system further comprises a DC/DC output converter for connecting to an HVDC connection, wherein the DC output of each generator of the plurality of generators is coupled to the DC/DC output converter.

By connecting to an HVDC connection, power transport over long distances to the consumer grid, e.g. from offshore wind parks, can be optimized.

According to a third aspect of the invention, there is provided a method of producing electric power by a generator, the generator comprising a generator unit having a stator and a rotatably supported rotor, the stator comprising a first set of windings and a second set of windings, the rotor inducing electrical voltage in the first set of windings and in the second set of windings when the rotor is rotated relative to the stator. The method comprises (a) operating a first converter coupled to the first set of windings to convert alternating voltage in the first set of windings into an output DC voltage, (b) providing the output DC voltage of the first converter to a DC output, and (c) operating a second converter coupled to the second set of windings and to the DC output to generate control voltages and/or control currents in the second set of windings.

This aspect of the invention is based on essentially the same idea as the first aspect described above.

According to a fourth aspect of the invention, there is provided a wind turbine for generating electric power, the wind turbine comprising a generator according to the first aspect or any of the above described embodiments.

The wind turbine is preferably a direct drive wind turbine.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

BRIEF DESCRIPTION

Some of the embodiments will be described in detail, with reference to the following figures, wherein like designations denote like members, wherein.

DETAILED DESCRIPTION

Figure 1:
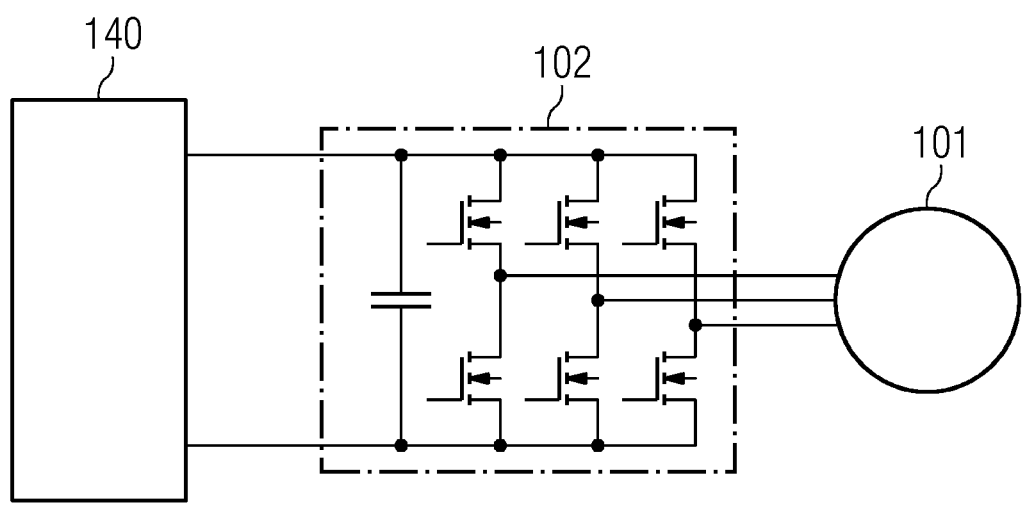
FIG. 1 shows a generator according to the prior art.

The illustration in the drawing is schematic. It is noted that in different figures, similar or identical elements are provided with the same reference numerals or with reference numerals which differ only within the first digit.

FIG. 1 shows a generator according to the prior art. More specifically, FIG. 1 shows a generator comprising a generator unit 101, such as a wind turbine generator, and a voltage source converter system 102 for converting 3 phases of alternating voltage output by the generator unit 101 into an output DC voltage. The output DC voltage is fed to grid 140. As discussed in the introduction of the present application, the voltage source converter system 102 operates in PWM mode in order to both provide the output DC voltage and to perform various control functions on the generator unit, such as flux control (Id currents) and injection of harmonic currents for reducing torque ripple etc.

Figure 2:
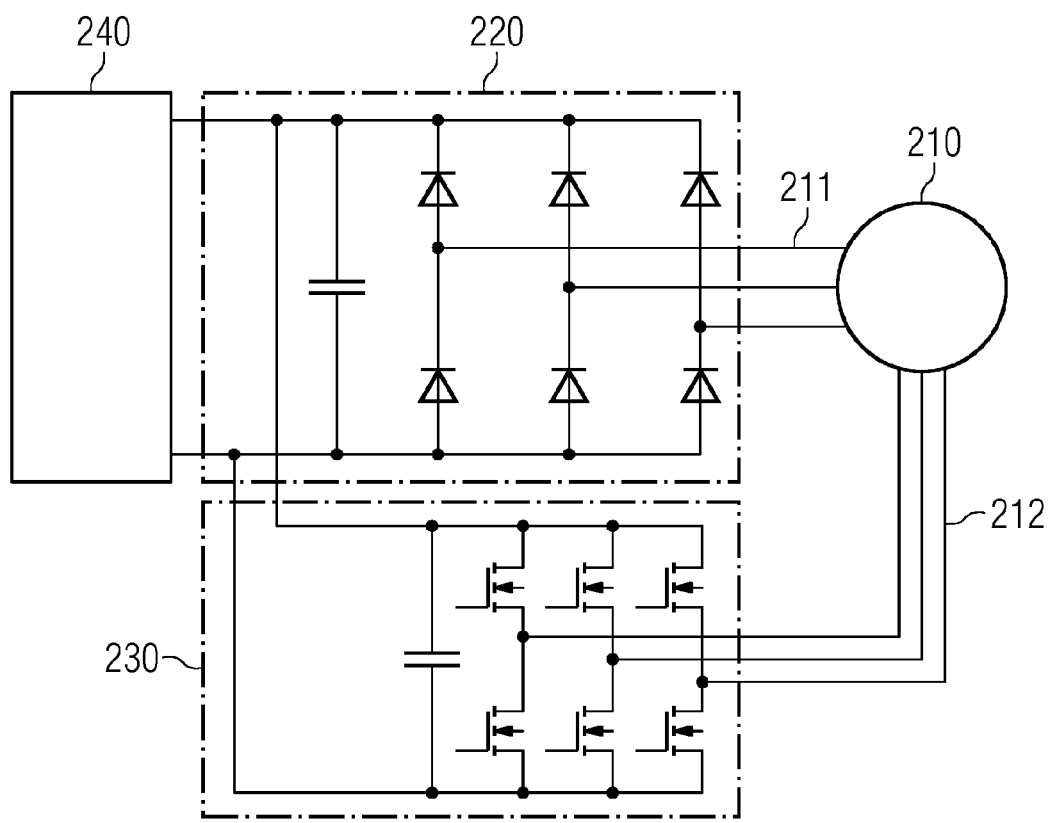
FIG. 2 shows a generator according to an embodiment of the present invention.

FIG. 2 shows a generator according to an embodiment of the present invention. As shown, the generator comprises a generator unit 210, a first (or main) converter 220 and a second (or auxiliary) converter 230. The first converter 220 is coupled to a first set of windings 211 of the generator unit 210. The second converter 230 is coupled to a second set of windings 212 of the generator unit 210. Both the first converter 220 and second converter 230 are adapted to generate an output DC voltage based on the respective alternating voltage that is induced in the first set of windings 211 and second set of windings 212 when a rotor (not shown) of the generator unit 210 is rotated relative to a stator (not shown) of the generator unit 210, e.g. due to wind. The DC output of both the first converter 220 and second converter 230 is connected to the grid 240.

The first converter 210 is a full-bridge diode rectifier designed to perform the main power conversion. The second converter is a PWM full-bridge converter with essentially the same structure as the prior art converter 102 shown in FIG. 1. However, here the second converter 230 is designed to mainly perform the control functions, such as generation of Id currents for flux control, injection of harmonic currents for torque ripple compensation, etc. The control functions performed by the second converter 230 are controlled by a control unit (not shown) which is adapted to control the second converter 230. To this end, the control unit may receive measurement data, such as currents in the first set of windings, currents in the second set of windings, voltage at the DC output, and current at the DC output from appropriately arranged sensors as known in the art.

Figure 3:
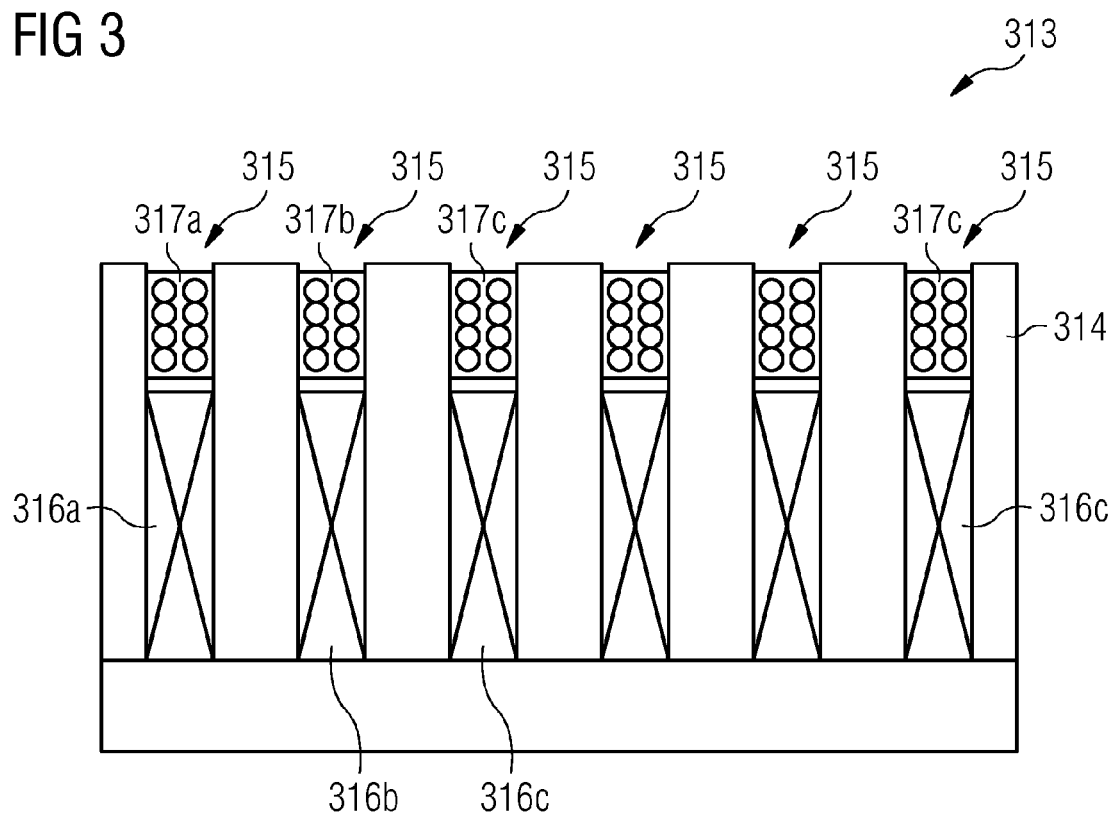
FIG. 3 shows a stator of a generator according to an embodiment of the present invention.

FIG. 3 shows a part of a stator 313 of a generator, such as the generator shown in FIG. 2, according to an embodiment of the present invention. As shown, the stator 313 comprises a stator body 314 having a plurality of stator slots 315. In the lower part of each slot 315, one winding 316a, 316b, 316c of the first set of windings 211 is arranged. On top of each winding 316a, 316b, 316c, one winding 317a, 317b, 317c of the second set of windings 212 is arranged. Accordingly, each slot 315 comprises one winding 316a, 316b, 316c of the first set of windings 211 and one winding 317a, 317b, 317c of the second set of windings 212. In the embodiment shown in FIG. 3, the windings 317a, 317b, 317c of the second set of windings 212 are arranged closer to the rotor (not shown) than the windings 316a, 316b, 316c of the first set of windings 211.

Figure 4:
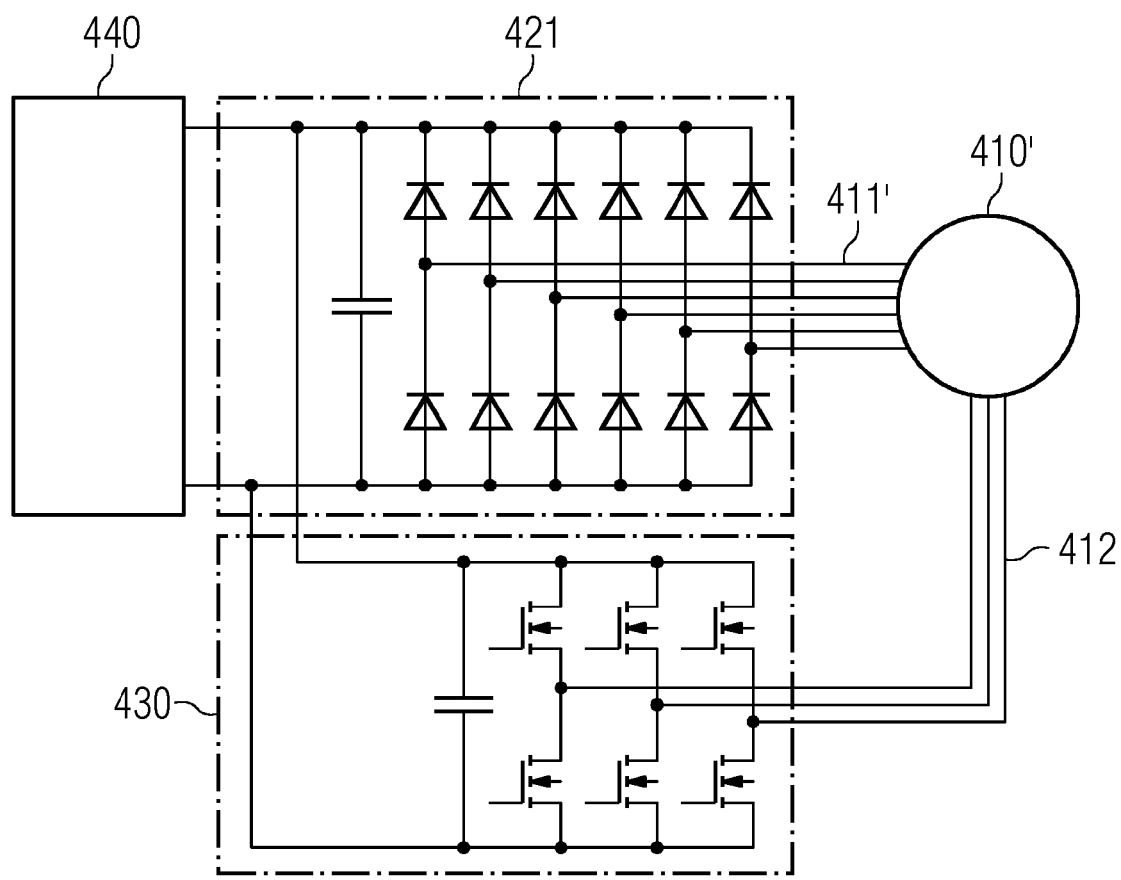
FIG. 4 shows a generator according to an embodiment of the present invention.

FIG. 4 shows a generator according to an embodiment of the present invention. The generator of FIG. 4 differs from the generator shown in FIG. 2 only in that the first converter 421 is a six-legged diode rectifier and in that the generator 410' comprises a first set of windings 411' having six windings. That is, in this embodiment power is generated by a six-phase generator while the second converter 430 is a 3-phase converter similar to the second converter 230 shown in FIG. 2. However, as the first converter 421 will produce less current ripple than the first converter 220 of FIG. 2, the second converter 430 in this embodiment may not be required to be able to provide as much control current as the second converter 230 in FIG. 2. Accordingly, the second converter 430 may be smaller and thus cheaper than the second converter 230.

Figure 5:
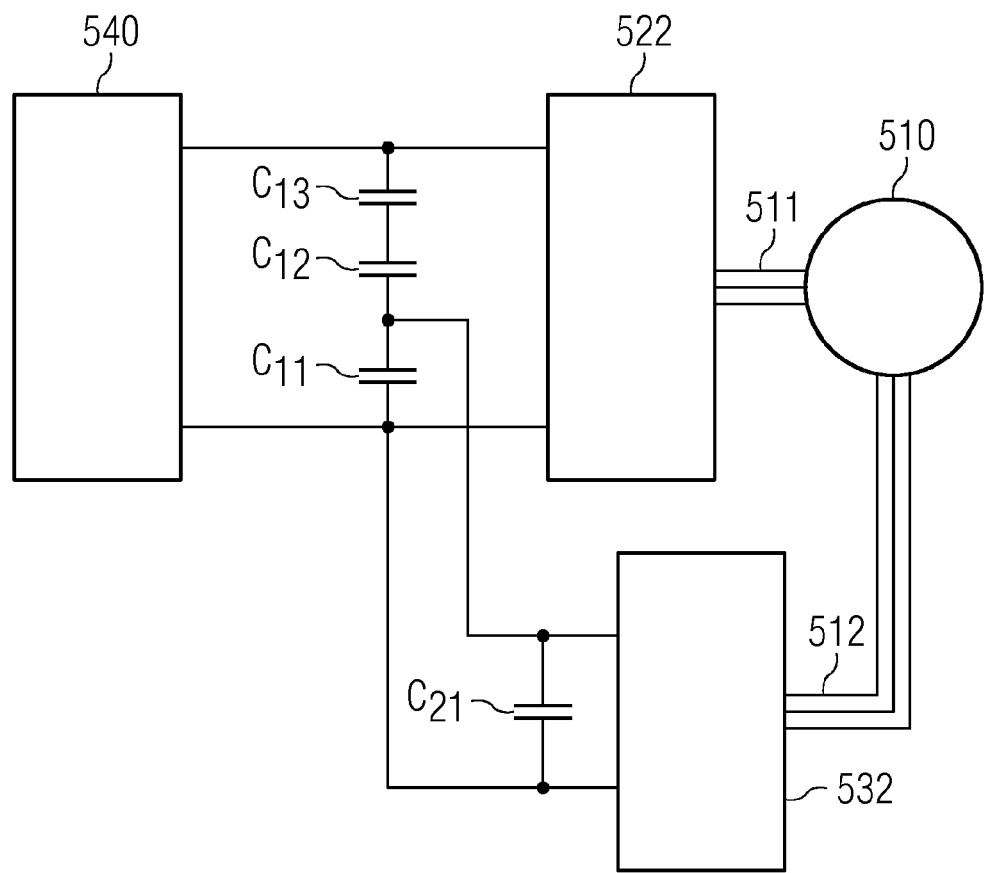
FIG. 5 shows a generator according to an embodiment of the present invention.

FIG. 5 shows a generator according to an embodiment of the present invention. The generator according to this embodiment differs from the generators shown in FIGS. 2 and 4 in that the output DC voltage of the first converter 522 is larger than the output DC voltage of the second converter 532. Otherwise, the first converter 522 corresponds to either of the converters 220 and 421, and the second converter 532 corresponds to either of the converters 230 and 430. In order to merge the different output DC voltages of the first converter 522 and second converter 532, the capacitor between the DC output terminals of the first converter 522 is formed as a series connection of capacitors $C_{11}$, $C_{12}$, and $C_{13}$ and the output DC voltage of the second converter 532 is coupled in parallel with only the capacitor $C_{11}$ through a similar capacitor $C_{21}$.

Thereby, the second converter 532 may be even simpler and cheaper than the second converters 230 and 430 of the preceding embodiments.

Figure 6:
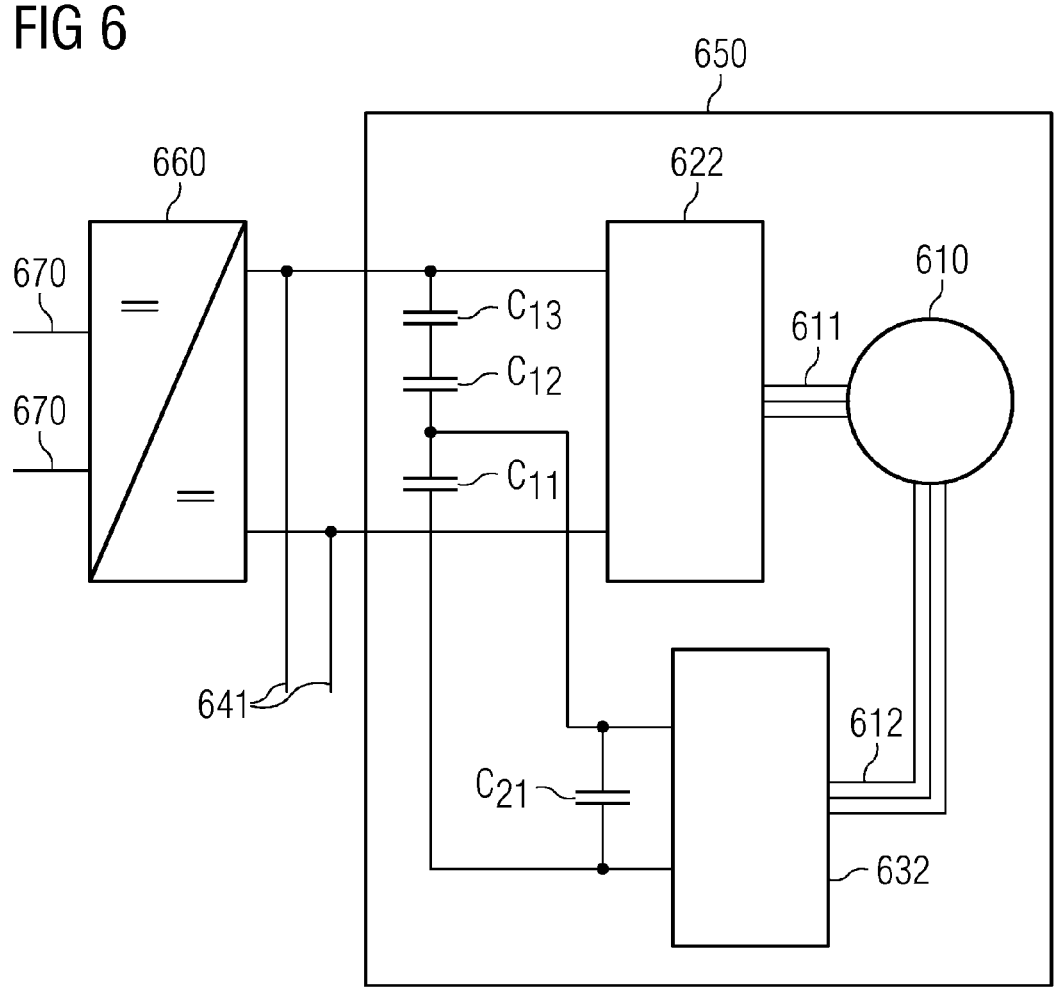
FIG. 6 shows a system according to an embodiment of the present invention.

FIG. 6 shows a system according to an embodiment of the present invention. More specifically, the system includes a plurality of generators 650 (only one is shown) corresponding to the generator shown in FIG. 5. However, it is noted that the generators 650 may be replaced by generators according to any other embodiment of the present invention. The generators 650 are connected in parallel via a shared DC link 641 which in turn is connected to the input of DC/DC converter 660. The DC converter converts the output DC voltage provided by the generators 650 to a voltage that is suitable for a HVDC connection 670.

The system shown in FIG. 6 may e.g. be suitable for large offshore wind parks positioned at a significant distance from the coast and thereby from the consumer grid.

Figure 7:
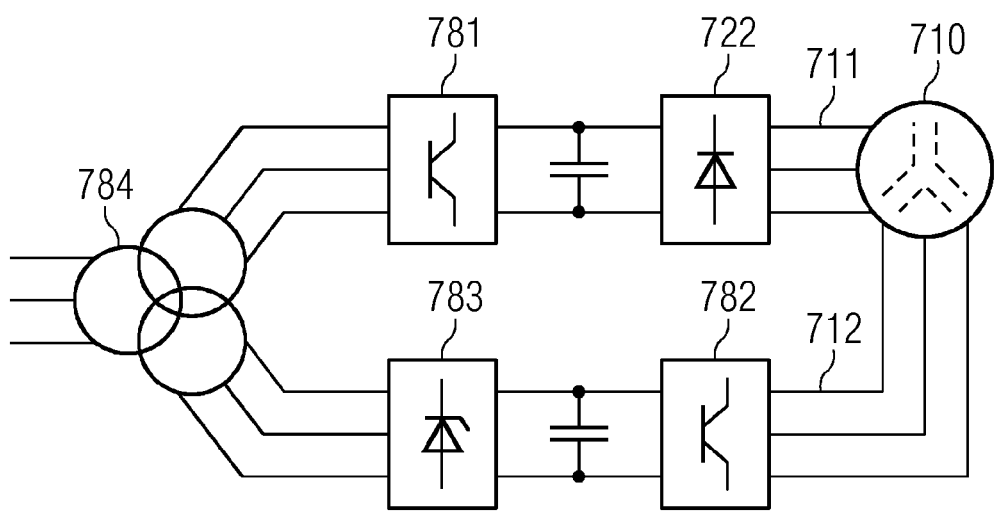
FIG. 7 shows a system according to a comparative example.

FIG. 7 shows a system according to a comparative example. More specifically, FIG. 7 shows a structure comprising a generator unit 710 with a first set of windings 711 and a second set of windings 712. The first set of windings 711 is connected to a first converter (diode rectifier) 722, which in turn is coupled to a 3-winding transformer 784 via a first grid converter 781. The second set of windings 712 is connected to a second converter 782, which in turn is coupled to the transformer 784 through a second grid converter 783.

The system shown in FIG. 7 is particularly useful as an exciter at startup of the generator 710. In this case, the second converter 783 and second grid converter 782 may provide control currents for the second set of windings in a similar manner as in the aforementioned embodiments but now using power from the grid at the other side of the transformer 784.

As shown in the above described embodiments, an auxiliary system comprising auxiliary windings, an auxiliary converter and auxiliary controller is implemented for performing various control functions, such that a main system can handle the actual power production. In some instances, the auxiliary system is also used to generate power. Furthermore, the auxiliary system can also be employed for motoring to suit various purposes, such as positioning of wind turbine elements (e.g. blades, nacelle etc.).

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

The invention claimed is:

1. A generator for producing electric power, the generator comprising:
a generator unit comprising a stator and a rotatably supported rotor, the stator having a first set of windings and a second set of windings, and wherein the rotatably supported rotor is configured to induce electrical voltage in the first set of windings and in the second set of windings when the rotatably supported rotor is rotated relative to the stator;
a first converter coupled to the first set of windings, the first converter being configured to convert alternating voltage in the first set of windings into an output DC voltage;

a DC output coupled to the first converter to receive the output DC voltage; and a second converter coupled to the second set of windings and to the DC output, the second converter being configured to generate control voltages and/or control currents in the second set of windings.

2. The generator according to claim 1, wherein the first converter comprises a diode full-bridge rectifier, and/or wherein the second converter comprises a PWM full-bridge converter.

3. The generator according to claim 1, wherein the second converter is configured to perform at least one of the following functions: a sensorless field orientated vector control, Id current control for field weakening or field strengthening, DC output voltage regulation, active and reactive power control, harmonic current control, torque ripple or vibration control, cogging torque control, generator power factor control or efficiency control by field regulation, and various other control functions.

4. The generator according to claim 1, further comprising a control unit for controlling operation of the second converter.

5. The generator according to claim 1, wherein the control unit is configured to control the second converter based on measurement data that is representative of the currents in the first set of windings, the currents in the second set of windings, the voltage at the DC output, and the current at the DC output.

6. The generator according to claim 1, wherein the stator comprises a plurality of stator slots for holding the first set of windings and the second set of windings, wherein each of the plurality of stator slot holds at least one winding of the first set of windings and at least one winding of the second set of windings.

7. The generator according to claim 1, wherein a number of windings in the first set of windings is equal to or larger than a number of windings in the second set of windings.

8. The generator according to claim 1, wherein the output DC voltage of the first converter is equal to an output DC voltage of the second converter, and wherein the first converter and the second converter are coupled in parallel to the DC output.

9. The generator according to claim 1, wherein the output DC voltage of the first converter is larger than an output DC voltage of the second converter, further wherein the first converter is coupled to the DC output via at least two capacitors ($C_{11}$, $C_{12}$, $C_{13}$) connected in series, and the second converter is coupled to the DC output via one of the at least two capacitors.

10. A system for generating electric power, the system comprising a plurality of generators according to claim 1.

11. The system according to claim 10, wherein at least one generator of the plurality of generators comprises a wind turbine.

12. The system according to claim 10, further comprising a DC/DC output converter for connecting to a HVDC connection, wherein the DC output of each generator of the plurality of generators is coupled to the DC/DC output converter.

13. A method of producing electric power by a generator, the generator comprising a generator unit having a stator and a rotatably supported rotor, the stator comprising a first set of windings and a second set of windings, the rotatably supported rotor inducing electrical voltage in the first set of windings and in the second set of windings when the rotatebly supported rotor is rotated relative to the stator, the method comprising:

operating a first converter coupled to the first set of windings to convert alternating voltage in the first set of windings into an output DC voltage;

providing the output DC voltage of the first converter to a DC output; and operating a second converter coupled to the second set of windings and to the DC output to generate control voltages and/or control currents in the second set of windings.

14. A wind turbine for generating electric power, the wind turbine comprising a generator according to claim 1.

* * * * *